(No Model.)
J. H. & T. D. MORRIS.
ANIMAL TRAP.
No. 288,182.　　　　　　　　　Patented Nov. 6, 1883.
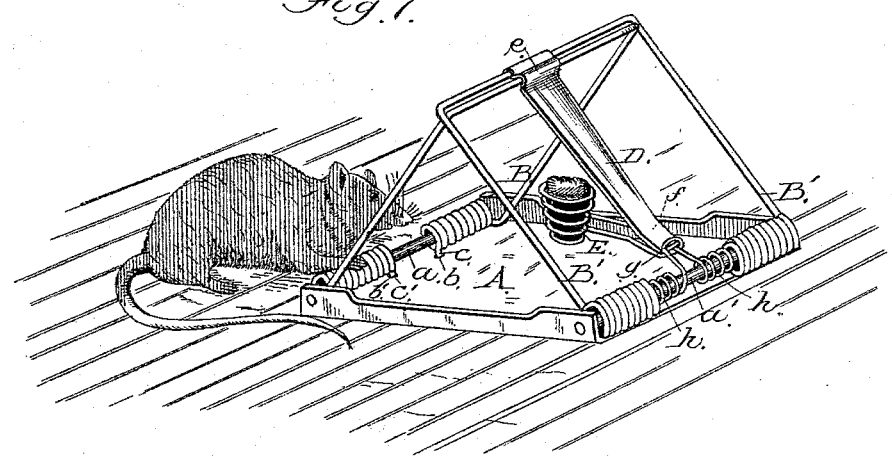
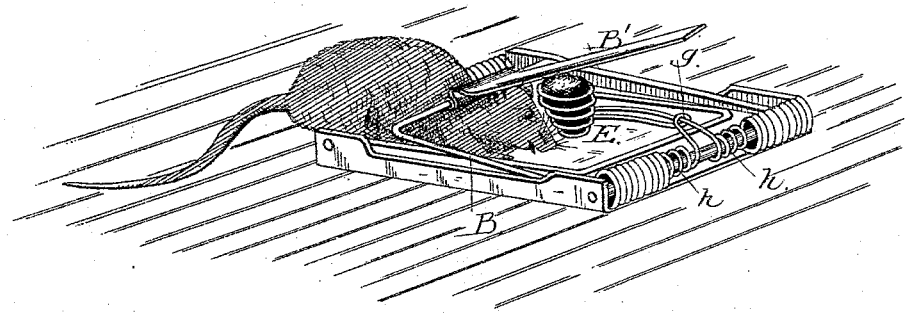
Witnesses;
H. Walter Fowler,
H. B. Applewhaite
Inventor;
John H. Morris
Thos. D. Morris
per atty.
A. H. Evans & Co.

UNITED STATES PATENT OFFICE.

JOHN H. MORRIS AND THOMAS D. MORRIS, OF SEWARD, NEBRASKA.

ANIMAL-TRAP.

SPECIFICATION forming part of Letters Patent No. 288,182, dated November 6, 1883.

Application filed March 2, 1883. (No model.)

*To all whom it may concern:*

Be it known that we, JOHN H. MORRIS and THOMAS D. MORRIS, of Seward, in the county of Seward and State of Nebraska, have invented certain Improvements in Animal-Traps; and we hereby declare the following to be a full, clear, and exact description thereof, reference being had to the accompanying drawings, making part of this specification, in which—

Figure 1 illustrates the trap set. Fig. 2 illustrates the trap sprung and an animal caught.

Our invention relates to that class of traps known as "dead-fall traps," and has for its object to provide a trap which will allow the animal to approach the bait from all points and yet be caught if the bait be attacked and the trap sprung.

Our invention consists in two spring-yokes secured to opposite ends of a plate or platform, and adapted to fall across and toward each other when released from the support of a central sustaining trigger, all of which is hereinafter fully described, and specifically set forth in the claims.

In order that those skilled in the art may make and use our invention and what we claim as new, we will proceed to describe the exact manner in which we have carried it out.

In the said drawings, A is a plate or platform having at its ends bars or rods $a\ a'$, which hold the coiled ends of spring-yokes B B', so that the said yokes, by means of the ends of the springs $c\ c'$ being thrust through the holes $b\ b'$ in plate A, are kept normally heavily depressed upon the face of said plate A. The yoke B' has clasped around its outer free end a trigger bar or plate, D, and immediately near the point of attachment the said plate has in it an abrupt bend, $e$, and from this bend the trigger extends in a straight line and terminates in a smooth flat end to engage in a catch, $g$, on the bait-holding device E, which is sustained by a spring, $h$, coiled around rod $a$. The bait-receptacle is made of an inverted pyramidal coil of light elastic wire, and stands at such relation to the trigger-plate when the trap is set that the efforts of the animal to withdraw the bait from between the wires will spring the trap.

In setting the trap, yokes B B' are raised and trigger D brought over until yoke B rests in the bend $e$, and the lower end of D is caught against catch $g$. This operation leaves the trap or the yokes locked in position to catch the animal. (See Fig. 1.)

Having thus described our invention, what we claim as new, and desire to secure by Letters Patent, is—

1. In an animal-trap, the platform A, in combination with two spring-yokes, B B', adapted to cross each other in falling, for the purpose set forth.

2. The spring-yokes B B', adapted to cross each other in falling, and plate A, in combination with the trigger D, provided with the bend $e$, substantially as described.

JOHN H. MORRIS.
THOMAS D. MORRIS.

Witnesses:
D. C. McKILLIP,
L. G. JOHNS.